US012164949B2

(12) United States Patent
Tsirkin et al.

(10) Patent No.: US 12,164,949 B2
(45) Date of Patent: Dec. 10, 2024

(54) MIGRATION SPEED-UP FOR MULTIPLE VIRTUAL MACHINES

(71) Applicant: Red Hat, Inc., Raleigh, NC (US)

(72) Inventors: Michael Tsirkin, Lexington, MA (US); David Alan Gilbert, Manchester (GB)

(73) Assignee: Red Hat, Inc., Raleigh, NC (US)

( * ) Notice: Subject to any disclaimer, the term of this patent is extended or adjusted under 35 U.S.C. 154(b) by 698 days.

(21) Appl. No.: 17/142,830

(22) Filed: Jan. 6, 2021

(65) Prior Publication Data

US 2022/0214901 A1 Jul. 7, 2022

(51) Int. Cl.
*G06F 9/455* (2018.01)
*G06F 9/50* (2006.01)
*G06F 12/1009* (2016.01)

(52) U.S. Cl.
CPC ........ *G06F 9/45558* (2013.01); *G06F 9/5088* (2013.01); *G06F 12/1009* (2013.01); *G06F 2009/4557* (2013.01); *G06F 2009/45583* (2013.01); *G06F 2212/152* (2013.01)

(58) Field of Classification Search
CPC ............... G06F 9/45558; G06F 9/5088; G06F 2009/4557; G06F 2212/152
See application file for complete search history.

(56) References Cited

U.S. PATENT DOCUMENTS

| 9,348,655 | B1 | 5/2016 | Tsirkin et al. |
| 10,095,536 | B2 | 10/2018 | Tsirkin |
| 10,156,986 | B2 | 12/2018 | Gopalan et al. |
| 10,579,409 | B2 | 3/2020 | Beveridge et al. |
| 10,805,171 | B1* | 10/2020 | Anwer .................... H04L 41/16 |
| 2015/0052322 | A1* | 2/2015 | Tsirkin .................. G06F 9/4856 711/162 |
| 2017/0262307 | A1* | 9/2017 | Venkatesh ........... G06F 16/1794 |
| 2018/0113610 | A1* | 4/2018 | Gopalan ............... G06F 9/5088 |
| 2018/0329737 | A1* | 11/2018 | Dong ................. G06F 9/45558 |
| 2020/0233723 | A1 | 7/2020 | Jha et al. |

FOREIGN PATENT DOCUMENTS

CN 104598303 B 4/2018

OTHER PUBLICATIONS

Examiner search result on "what is kernel same page merging", searched on 2023, results limited to before Jan. 1, 2020 (Year: 2023).*
"Kernel Same-Page Merging (KSM)," Red Hat, Inc., 2020, https://access.redhat.com/documentation/en-us/red_hat_enterprise_linux/7/html/virtualization_tuning_and_optimization_guide/chap-ksm.
Erik Gustafsson, "Optimizing Total Migration Time in Virtual Machine Live Migration," Uppsala University, Department of Information Technology, Mar. 2013, https://www.diva-portal.org/smash/get/diva2:609356/fulltext01.pdf.

* cited by examiner

*Primary Examiner* — Kenneth Tang
*Assistant Examiner* — Kevin X Lu
(74) *Attorney, Agent, or Firm* — Womble Bond Dickinson (US) LLP

(57) ABSTRACT

A method includes identifying two virtual machines (VMs) to be migrated from a source host. The method further includes determining that the two VMs correspond to identical memory pages in a memory deduplicaiton module. The method further includes recording, in hypervisor memory, an indication that the two VMs correspond to the two identical memory pages in the memory deduplication module. The method further includes sending, by a processing device of the hypvervisor, a single memory page of the two identical memory pages to a first destination host.

12 Claims, 5 Drawing Sheets

MIGRATION SPEED-UP FOR MULTIPLE VIRTUAL MACHINES

TECHNICAL FIELD

Aspects of the present disclosure relate to virtual machines and more specifically, to migration speed-up for multiple virtual machines.

BACKGROUND

In computing, kernel same-page merging (KSM), also known as kernel shared memory, memory merging, memory deduplication, and page deduplication, is a kernel feature that makes it possible for a hypervisor system to share memory pages that have identical contents between multiple processes and/or virtualized guests. While not directly linked, Kernel-based Virtual Machine (KVM) can use KSM to merge memory pages occupied by virtual machines.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
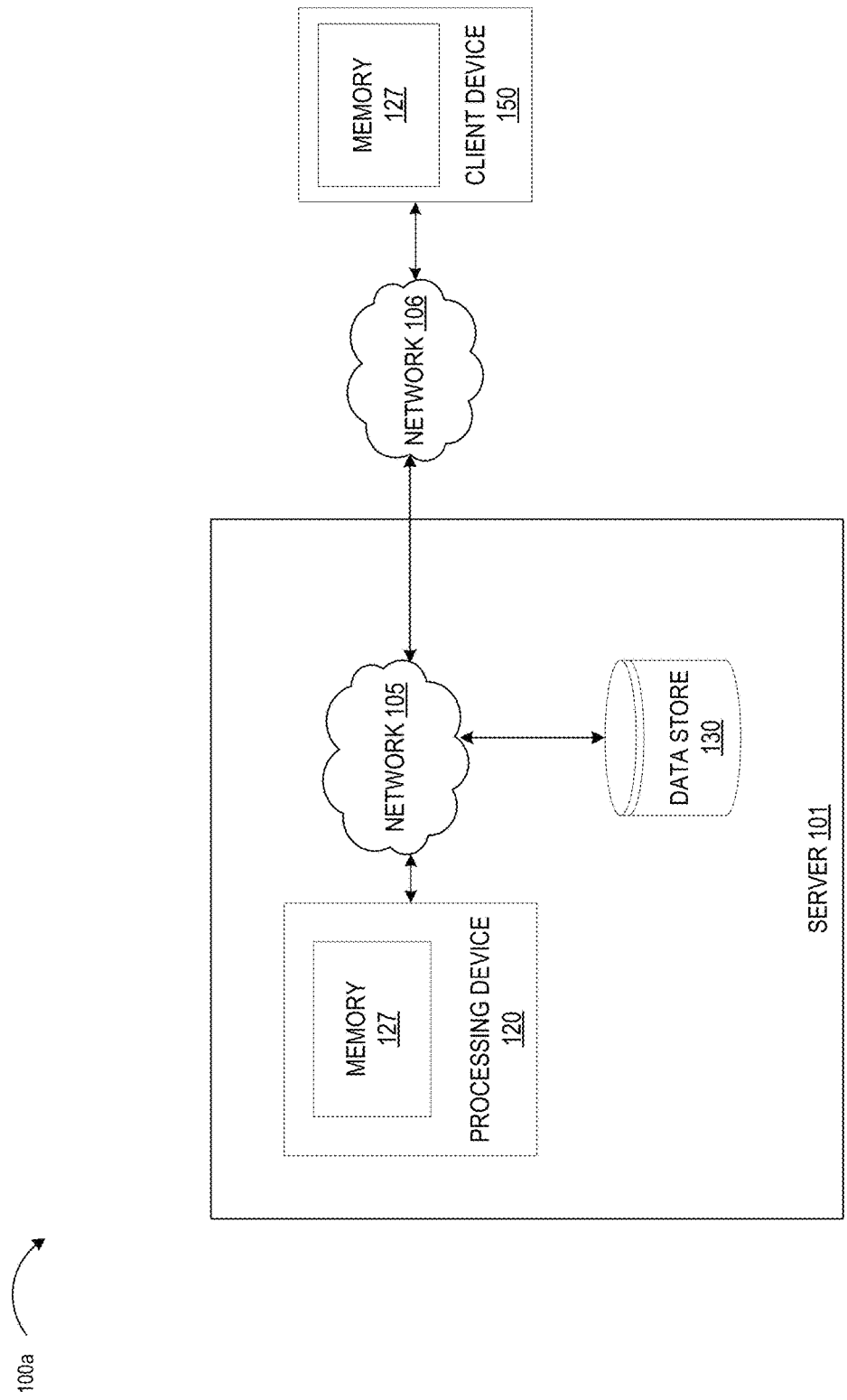
FIG. 1A is a block diagram that illustrates a first example system, in accordance with some embodiments of the present disclosure.

In one embodiment, migration speed-up for multiple virtual machines is described herein. In one embodiment, virtual machine (VM) migration may present an attractive and seamless solution for a wide class of problems, including load balancing and high availability. One problem that exists with VM migration, however, are the demands the migration places on the network. In one example, if a host runs multiple VMs and is overloaded, multiple guests may need to be migrated away from it. Disadvantageously, moving multiple guests from an already overloaded host, as described in the current example, can take multiple seconds and further overload the host from which they are migrated. The overloading caused by the migration only compounds the problem the migration is attempting to solve, further taxing valuable system resources and wasting time.

In one alternative embodiment, compression may be utilized to attempt to solve the above problems. However, as VMs have been observed to commonly share approximately 70% of their memory, the embodiments described herein have the potential to be more efficient than alternative compression techniques. Disadvantageously, compression is also typically local (e.g., within a VM), and are thus limited to a single destination, whereas the embodiments described herein may be used to speed up migration when there are two or more migration destinations.

Advantageously, the embodiments described herein overcome the above problems, and others, by providing systems and methods for migration speed-up for multiple virtual machines using a memory deduplication module. A variety of systems and methods are described herein to solve the above problems, and others. Operations of solution systems and methods include the sending of a single memory page to a first destination host and utilizing the first destination host to send the page to a second destination host, thus freeing up a bottle-necked source VM, for example. Kernel same-page merging (KSM) is one example of a memory deduplicaiton module that may perform the solution operations.

In computing, KSM, also known as kernel shared memory, memory merging, memory deduplication, and page deduplication, is a kernel feature that makes it possible for a hypervisor system to share memory pages that have identical contents between multiple processes and/or virtualized guests. While not directly linked, Kernel-based Virtual Machine (KVM) can use KSM to merge memory pages occupied by virtual machines.

In one embodiment, KSM performs memory deduplication by scanning through main memory for physical pages that have identical content, and identifying the virtual pages that are mapped to those physical pages. It leaves one page unchanged, and re-maps each duplicate page to point to the same physical page, after which it releases the extra physical page(s) for re-use. It also marks both virtual pages as "copy-on-write:" (COW), so that kernel will automatically remap a virtual page back to having its own separate physical page as soon as any process begins to write to it.

By leveraging a memory deduplication module (e.g., KSM) to assist with the migration of multiple VMs, the embodiments described herein solve the above problems, and others, by speeding-up the process by multiple seconds and reduce the overload of the host from which the VMs are migrated. Such techniques save valuable system resources and time.

FIG. 1A is a block diagram that illustrates a first example system 100a, in accordance with some embodiments of the present disclosure. As discussed herein, memory 127 may include logic and/or applications that enable the operations and systems described herein, when executed. In one embodiment, memory 127 may be an in-cache memory, as described herein. In one embodiment, system 100a may be described as an apparatus, including logic and components for performing the operations described herein (e.g., server 101, network 106, client device 150, etc.). In one embodiment, memory 127 resides in whole or in part on a server (e.g., server 101) of system 100a. In another embodiment, memory 127 resides in whole or in part on a client device (e.g., client device 150) of system 100a. In yet another embodiment, memory 127 resides in whole or in part on any combination of the two, or in a different system entirely.

Server 101 may include various components, which may allow an application to be accesses and executed from memory 127 on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes a memory 127, a computing processing device 120, a data store 130, and a network 105. The memory 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include memory 127, in addition to, or alternatively from, server 101. Further implementation details of the operations performed by system 101 are described with respect to FIGS. 1B-4.

Figure 1B:
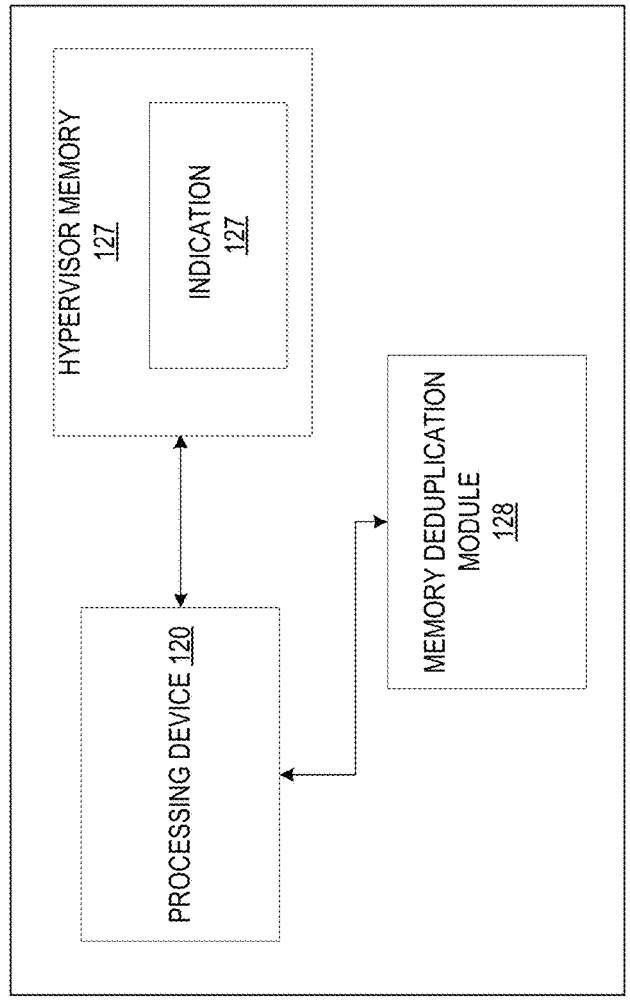
FIG. 1B is a block diagram that illustrates a second example system, in accordance with some embodiments of the present disclosure.

FIG. 1B is a block diagram that illustrates a second example system 100b, in accordance with some embodiments of the present disclosure. System 100b includes one or more components. As discussed herein, memory 127 may be a hypervisor memory and store an indication 129 that two VMs correspond to two identical memory pages (e.g., in the memory deduplication module 128), according to the systems and methods described herein. In one embodiment, hypervisor memory 127 resides in whole or in part on a server (e.g., server 101) of system 100b. In another embodiment, hypervisor memory 127 resides in whole or in part on a client device (e.g., client device 150 of FIG. 1) of system 100b. In yet another embodiment, hypervisor memory 127 resides in whole or in part of any combination of the two, or in a different system entirely.

System 100b may include various components, which may allow hypervisor memory 127 to run on a server device or client device. Each component may perform different functions, operations, actions, processes, methods, etc., for the embodiments described herein and/or may provide different services, functionalities, and/or resources for the embodiments described herein.

As illustrated in FIG. 1B, system 100b includes a hypervisor memory 127, a processing device 120, and a memory deduplication module 128. The hypervisor memory 127, the processing device 120, and the memory deduplication module 128 may be coupled to each other (e.g., may be operatively coupled, communicatively coupled, may communicate data/messages with each other) via a network, bus, or the like, or located within each other. The network may be a public network (e.g., the internet), a private network (e.g., a local area network (LAN) or wide area network (WAN)), or a combination thereof. In one embodiment, the network may include a wired or a wireless infrastructure, which may be provided by one or more wireless communications systems, such as a Wi-Fi hotspot connected with the network and/or a wireless carrier system that can be implemented using various data processing equipment, communication towers (e.g. cell towers), etc.

The network may carry communications (e.g., data, message, packets, frames, etc.) between the various components of system 100b. Optionally, system 100b may include a data store, which may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The system 100b may comprise any suitable type of computing device or machine that has a programmable processor including, for example, server computers, desktop computers, laptop computers, tablet computers, smartphones, set-top boxes, etc. In some examples, the system 100b may comprise a single machine or may include multiple interconnected machines (e.g., multiple servers configured in a cluster). The system 100b may be implemented by a common entity/organization or may be implemented by different entities/organizations. For example, a system 100b may be operated by a first company/corporation and a second server (not pictured) may be operated by a second company/corporation. Each server may execute or include an operating system (OS), or operating from a single OS in a containerized fashion, as discussed in more detail herein. The OS of a server may manage the execution of other components (e.g., software, applications, etc.) and/or may manage access to the hardware (e.g., processors, memory, storage devices etc.) of the computing device.

In one embodiment, system 100*b* is operably connected to a client device (e.g., 150 via a network 106 of FIG. 1*a*). The network may be a public network (e.g., the internet), a private network (e.g., a local area network (LAN) or wide area network (WAN)), or a combination thereof. In one embodiment, the network may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network may carry communications (e.g., data, message, packets, frames, etc.) between the various components of system 100*b*. The client device may also include a memory, in addition to, or alternatively from, system 100*b*.

In one embodiment, the processing device 120 may perform a variety of operations, as described herein. For example, processing device 120 may identify two virtual machines (VMs) to be migrated from a source host, and determine that the two VMs correspond to identical memory pages in a memory deduplicaiton module (e.g., 128). Processing device 120 may further record, in the hypervisor memory (e.g., 127), an indication (e.g., 129) that the two VMs correspond to the two identical memory pages in the memory deduplication module (e.g., 128). In one embodiment, processing device may further send, by the hypvervisor, a single memory page of the two identical memory pages to a first destination host. Further implementation details of the operations performed by system 100*b* are described with respect to FIGS. 1A and 1B-4.

Figure 2:
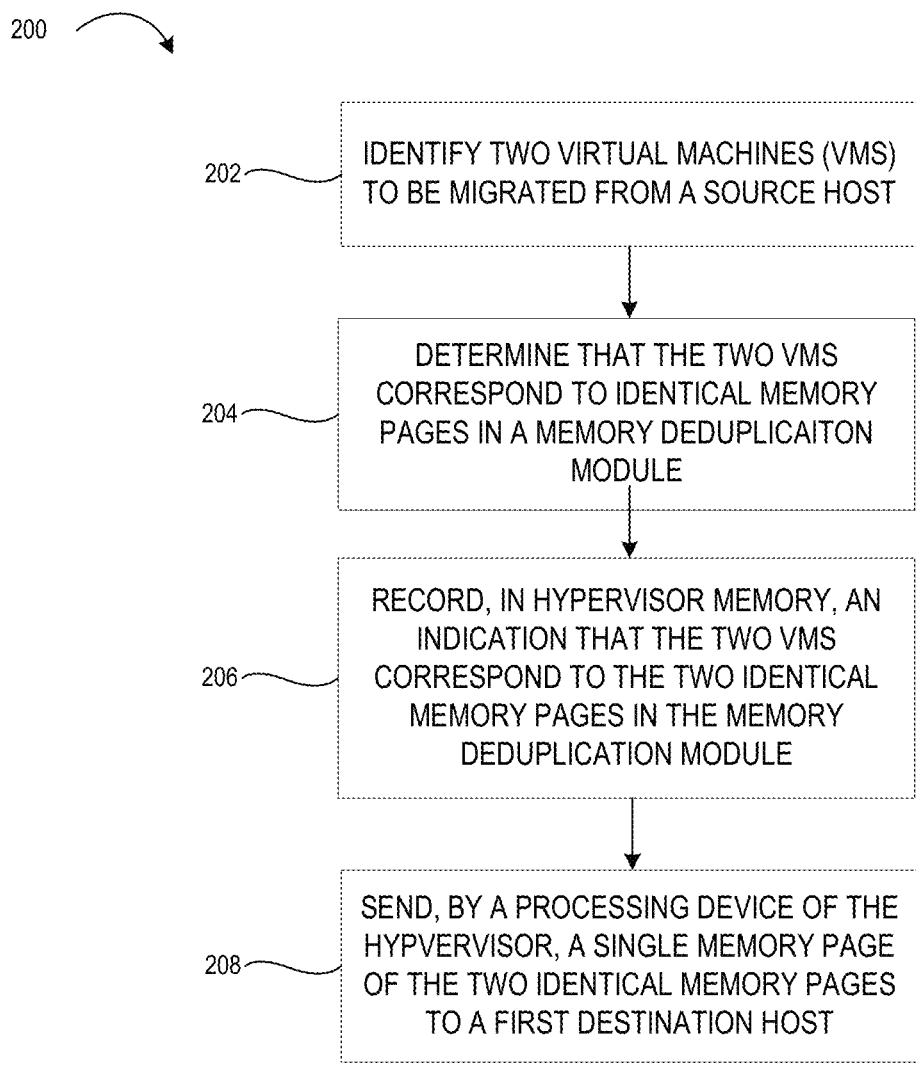
FIG. 2 is a flow diagram of a first method of migration speed-up for multiple virtual machines, in accordance with some embodiments of the present disclosure.

FIG. 2 is a flow diagram of a first method of migration speed-up for multiple virtual machines, in accordance with some embodiments of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-B may perform one or more of the following operations. For example, in one embodiment, processing logic of processing device 120 performs the following operations, with respect to the individual components of FIG. 1A-B. In another embodiment, any other suitable processing device may perform the described operations.

Referring to FIG. 2, at block 202, processing logic may identify two virtual machines (VMs) to be migrated from a source host. In one embodiment, the identifying is performed in response to receiving a load-balancing request. For example, the two source virtual machines identified may exceed a predefined lead balancing threshold. For example, a load balancing threshold may indicate a storage, compute, or resource capacity level associated with a virtual machine. Processing logic may further identify destination VMs, which may be identified based on a determination that they are below a load balancing threshold (may be the same, or different, load balancing threshold than used to identify the two source VMs).

At block 204, processing logic may determine that the two VMs correspond to identical memory pages in a memory deduplicaiton module. In one embodiment, the memory pages may be duplicate memory pages. In another embodiment, the second memory page may simply refer to the first memory page. In one embodiment, the memory deduplication module comprises a kernel same-page merging (KSM) schema. In another embodiment, any other deduplicaiton schema or module may be used.

At block 206, processing logic may record, in hypervisor memory, an indication that the two VMs correspond to the two identical memory pages in the memory deduplication module. In one embodiment, the indication may be a flag that is set when the memory pages are identical. In other embodiments, the indication may include additional information, such as identifiers of the VMs, memory pages, storage locations, or the like. In one embodiment, the recording of the indication that the two VMs correspond to the two identical memory pages is performed without deduplicating the two identical memory pages.

At block 208, processing logic may send, by a processing device of the hypvervisor, a single memory page of the two identical memory pages to a first destination host (e.g., which may be identified my processing logic, as described above). In one embodiment, the second, identical memory page corresponding to the second VM is not sent.

Figure 3:
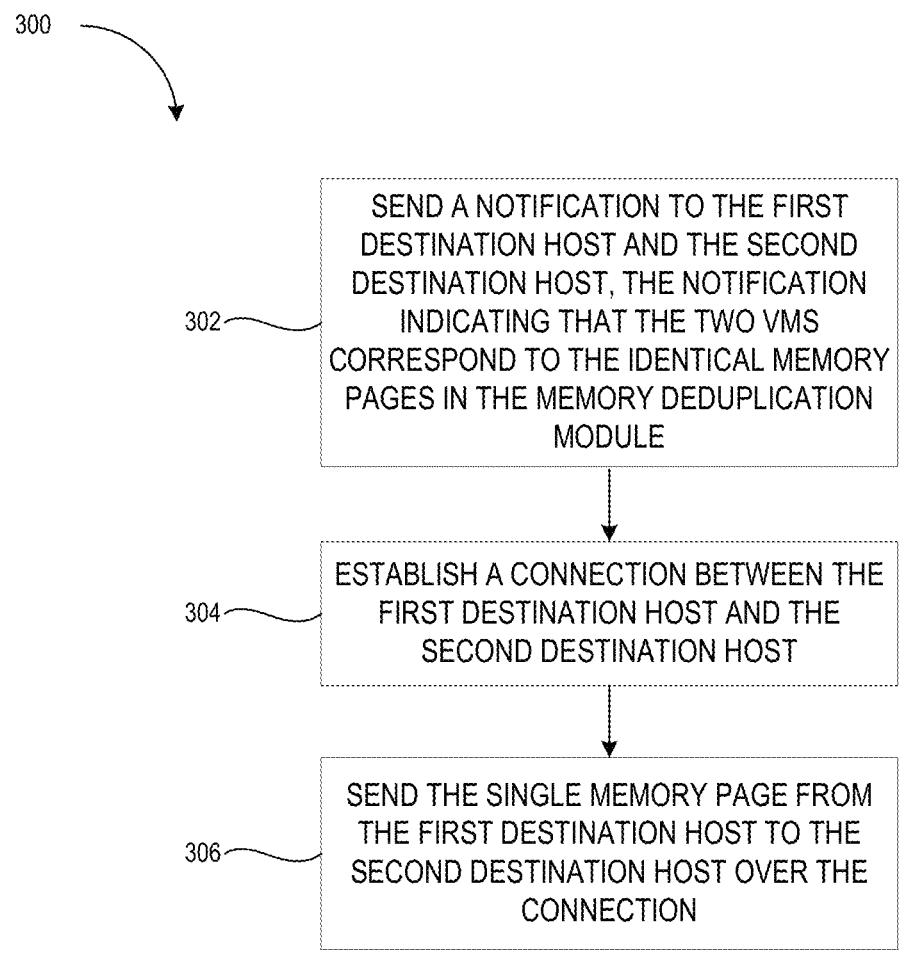
FIG. 3 is a flow diagram of a second method of migration speed-up for multiple virtual machines, in accordance with some embodiments of the present disclosure.

FIG. 3 is a flow diagram of a second method of migration speed-up for multiple virtual machines, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-B may perform one or more of the following operations. For example, in one embodiment, processing logic of processing device 120 performs the following operations, with respect to the individual components of FIG. 1A-B. In another embodiment, any other suitable processing device may perform the described operations.

In one embodiment, a first VM of the two VMs (e.g., of FIG. 2) is to be migrated to the first destination host, and a second VM of the two VMs is to be migrated to a second destination host. Referring to FIG. 3, at block 302, processing logic may send a notification to the first destination host and to the second destination host. In one embodiment, the notification may indicate that the two VMs correspond to the identical memory pages in the memory deduplication module. Processing logic at block 304 may then establish a connection between the first destination host and the second destination host. In one embodiment, this may be a connection that allows for the communication of the first destination host and the second destination host without routing through either of the two source VMs.

At block 306, processing logic may then send the single memory page from the first destination host to the second destination host over the connection (e.g., without routing the single memory page through any of the two VMs). Advantageously, this allows for a reduction in workload and/or throughput for the two VMs. In one embodiment, the sending of the single memory page to the first destination host and the sending of the single memory page to the second destination host occur over different network segments, so as to spread out the resource requirements.

Figure 4:
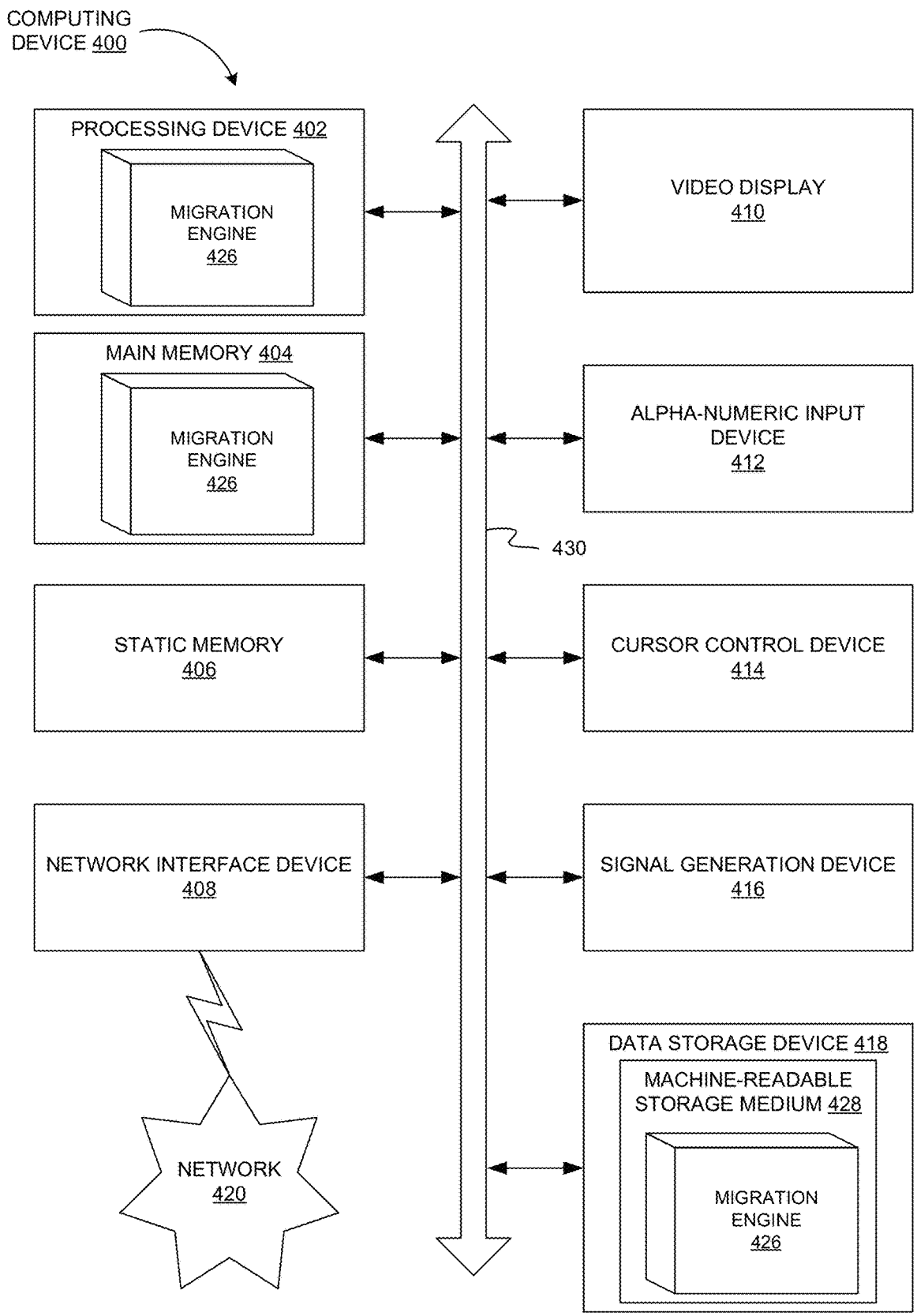
FIG. 4 is a block diagram of an example computing device that may perform one or more of the operations described herein, in accordance with some embodiments of the present disclosure.

FIG. 4 is a block diagram of an example computing device 400 that may perform one or more of the operations described herein, in accordance with some embodiments of the present disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein. In one embodiment, processing device 402 represents processing device 120 of FIG. 1A. In another embodiment, processing device 402 represents a processing device of a client device (e.g., client device 150 of FIG. 1A).

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions, e.g., instructions for carrying out the operations described herein, in accordance with one or more aspects of the present disclosure. Instructions implementing migration engine 426 may also reside, completely or at least partially, within main memory 404 and/or within processing device 402 during execution thereof by computing device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   in response to receiving a load-balancing request:
   identifying two virtual machines (VMs) of a plurality of virtual machines to be migrated from a source host to a first destination host and a second destination host;
   determining, by a memory deduplication module, that the two identified VMs correspond to identical memory pages, wherein the identical memory pages comprise a first physical memory page and a second physical memory page that is a duplicate of the first physical memory page;
   recording, in hypervisor memory, an indication that the two identified VMs correspond to the identical memory pages without deduplicating the identical memory pages, wherein the indication comprises; a flag that indicates that the memory pages are identical, identifiers that identify the two VMs, identifiers that identify the identical memory pages, and identifiers that identify the storage locations of the identical memory pages;
   sending, by a processing device of the hypervisor, the first physical memory page of the identical memory pages to a first destination host; and
   based on the sending to the first destination host, the first destination host sending the first physical memory page received from the source host to the second destination host.

2. The method of claim 1, further comprising:
   sending a notification to the first destination host and the second destination host, the notification indicating that the two identified VMs correspond to the identical memory pages in the memory deduplication module; and
   establishing a connection between the first destination host and the second destination host;
   wherein the first physical memory page is sent from the first destination host to the second destination host over the connection.

3. The method of claim 2, wherein the sending of the first physical memory page to the first destination host and the sending of the first physical memory page to the second destination host occur over different network segments.

4. The method of claim 1, wherein the memory deduplication module comprises a kernel same-page merging (KSM) schema.

5. A system, comprising:
   a hypervisor memory; and
   a processing device operatively coupled to the memory, the processing device to:
   in response to receiving a load-balancing request:
   identify two virtual machines (VMs) of a plurality of virtual machines to be migrated from a source host to a first destination host and a second destination host;
   determine, by a memory deduplication module, that the two identified VMs correspond to identical memory pages, wherein the identical memory pages comprise a first physical memory page and a second physical memory page that is a duplicate of the first physical memory page;
   record, in the hypervisor memory, an indication that the two identified VMs correspond to the identical memory pages without deduplicating the identical memory pages, wherein the indication comprises; a flag that indicates that the memory pages are identical, identifiers that identify the two VMs, identifiers that identify the identical memory pages, and identifiers that identify the storage locations of the identical memory pages;
   send, by the processing device of the hypervisor, the first physical memory page of the identical memory pages to a first destination host; and based on the sending to the first destination host, the first destination host sending the first physical memory page received from the source host to the second destination host.

6. The system of claim 5, the processing device further to:
send a notification to the first destination host and the second destination host, the notification indicating that the two identified VMs correspond to the identical memory pages in the memory deduplication module; and
establish a connection between the first destination host and the second destination host;
wherein the first physical memory page is sent from the first destination host to the second destination host over the connection.

7. The system of claim 6, wherein the sending of the first physical memory page to the first destination host and the sending of the first physical memory page to the second destination host occur over different network segments.

8. The system of claim 5, wherein the memory deduplication module comprises a kernel same-page merging (KSM) schema.

9. A non-transitory computer-readable storage medium including instructions that, when executed by a processing device, cause the processing device to:
in response to receiving a load-balancing request:
identify two virtual machines (VMs) of a plurality of virtual machines to be migrated from a source host to a first destination host and a second destination host;
determine, by a memory deduplication module, that the two identified VMs correspond to identical memory pages, wherein the identical memory pages comprise a first physical memory page and a second physical memory page that is a duplicate of the first physical memory page;
record, in the hypervisor memory, an indication that the two identified VMs correspond to the identical memory pages without deduplicating the identical memory pages, wherein the indication comprises: a flag that indicates that the memory pages are identical, identifiers that identify the two VMs, identifiers that identify the identical memory pages, and identifiers that identify the storage locations of the identical memory pages;
send, by the processing device of the hypervisor, the first physical memory page of the identical memory pages to a first destination host; and
based on the sending to the first destination host, the first destination host sending the first physical memory page received from the source host to the second destination host.

10. The non-transitory computer-readable storage medium of claim 9, the processing device further to:
send a notification to the first destination host and the second destination host, the notification indicating that the two identified VMs correspond to the identical memory pages in the memory deduplication module; and
establish a connection between the first destination host and the second destination host;
wherein the first physical memory page is sent from the first destination host to the second destination host over the connection.

11. The non-transitory computer-readable storage medium of claim 10, wherein the sending of the first physical memory page to the first destination host and the sending of the first physical memory page to the second destination host occur over different network segments.

12. The non-transitory computer-readable storage medium of claim 9, wherein the memory deduplication module comprises a kernel same-page merging (KSM) schema.

* * * * *